(12) United States Patent
Chino et al.

(10) Patent No.: US 7,669,418 B2
(45) Date of Patent: Mar. 2, 2010

(54) HEAT ENERGY SUPPLY SYSTEM AND METHOD, AND RECONSTRUCTION METHOD OF THE SYSTEM

(75) Inventors: Kooichi Chino, Hitachi (JP); Moriaki Tsukamoto, Tokai (JP); Toshihiko Fukushima, Tsuchiura (JP); Shigeo Hatamiya, Hitachi (JP)

(73) Assignee: Hitachi, Ltd., Tokyo (JP)

( * ) Notice: Subject to any disclaimer, the term of this patent is extended or adjusted under 35 U.S.C. 154(b) by 1110 days.

(21) Appl. No.: 11/304,626

(22) Filed: Dec. 16, 2005

(65) Prior Publication Data

US 2006/0130482 A1 Jun. 22, 2006

(30) Foreign Application Priority Data

Dec. 17, 2004 (JP) .............................. 2004-365380

(51) Int. Cl.
*F01K 13/00* (2006.01)
(52) U.S. Cl. .......................................... 60/645; 60/670
(58) Field of Classification Search .................. 60/645, 60/670
See application file for complete search history.

(56) References Cited

U.S. PATENT DOCUMENTS

| | | | | |
|---|---|---|---|---|
| 4,330,084 A | * | 5/1982 | Buchner et al. | ............ 237/12.1 |
| 4,660,511 A | * | 4/1987 | Anderson | .................... 122/420 |
| 5,000,003 A | * | 3/1991 | Wicks | .......................... 60/618 |
| 5,272,878 A | | 12/1993 | Schlichtig et al. | |
| 5,507,141 A | * | 4/1996 | Stigsson | ....................... 60/775 |
| 5,775,107 A | * | 7/1998 | Sparkman | ................... 60/641.8 |
| 6,050,083 A | * | 4/2000 | Meckler | ................... 60/39.182 |

FOREIGN PATENT DOCUMENTS

| | | |
|---|---|---|
| CH | 304 499 A | 1/1955 |
| DE | 198 31 697 | 4/2001 |
| EP | 099 501 A | 2/1984 |
| JP | 02-181002 | 7/1990 |
| JP | 7-4212 | 1/1995 |
| JP | 2001-147055 | 5/2001 |
| WO | WO 93/10335 | 5/1993 |

* cited by examiner

*Primary Examiner*—Hoang M Nguyen
(74) *Attorney, Agent, or Firm*—Mattingly & Malur, P.C.

(57) ABSTRACT

A heat energy supply system and method capable of drastically increasing energy efficiency and energy supply efficiency, as well as a reconstruction method of the heat energy supply system. The heat energy supply system comprises a boiler for heating a heat medium and producing steam including water and other vapors, a heat pump including a steam turbine driven by the steam supplied from the boiler and a heat exchanger for heating the heat medium by employing waste heat or heat obtained from environment, thereby producing the steam at a setting temperature, and a steam supply line for supplying the steam discharged from the steam turbine and the steam heated by the heat exchanger to a heat utilization facility.

10 Claims, 6 Drawing Sheets

HEAT ENERGY SUPPLY SYSTEM AND METHOD, AND RECONSTRUCTION METHOD OF THE SYSTEM

BACKGROUND OF THE INVENTION

1. Field of the Invention

The present invention relates to a heat energy supply system and method for supplying heat energy to a heat utilization facility, and also relates to a method of reconstructing the heat energy supply system by utilizing the existing equipment.

2. Description of the Related Art

As one proposal aiming to improve energy efficiency of a heat energy supply system, there is known a combination of a cogeneration system and a heat pump (see, e.g., Patent Document 1: JP,B 7-4212). The heat pump is to take in atmospheric heat, waste heat, etc. In that related art, hot water and cold water produced by the heat pump are utilized as washing water, cooling water, etc. in a facility.

Also, in a system using a heat pump alone without generation of electric power, it is proposed to utilize, as a medium, water instead of Freon that has hitherto been used (see Patent Document 2: JP,A 2001-147055).

SUMMARY OF THE INVENTION

In the case of supplying heat energy to a heat utilization facility, however, it is difficult to maintain an amount of energy transferable per unit medium weight at a sufficient level even with hot water and cooling water used as heat mediums. For that reason, even when the hot water and the cooling water produced by using the heat pump are supplied to the heat utilization facility according to the above-mentioned related art, the installation place of a heat energy supply system is limited to an area near the heat utilization facility.

Further, it is known that, by utilizing water as a heat medium in the heat pump, steam (water vapor) having high energy density can be used as a heat medium. However, large motive power is required to compress the steam having low density, and practical use of such a system is limited.

In view of the state of the art described above, an object of the present invention is to provide a heat energy supply system and method capable of drastically increasing energy efficiency and energy supply efficiency, as well as a reconstruction method of the heat energy supply system.

To achieve the above object, the heat energy supply system of the present invention comprises a boiler for heating a heat medium and producing steam including water and other vapors, a heat pump including a steam turbine driven by the steam supplied from the boiler and a heat exchanger for heating the heat medium by employing external, thereby producing the steam at a setting temperature, and a steam supply line for supplying the steam discharged from the steam turbine and the steam heated by the heat exchanger to a heat utilization facility.

According to the present invention, energy efficiency and energy supply efficiency can be drastically increased.

DESCRIPTION OF THE PREFERRED EMBODIMENTS

Cogeneration systems according to embodiments of the present invention will be described below with reference to the drawings.

(1) First Embodiment

Figure 1:
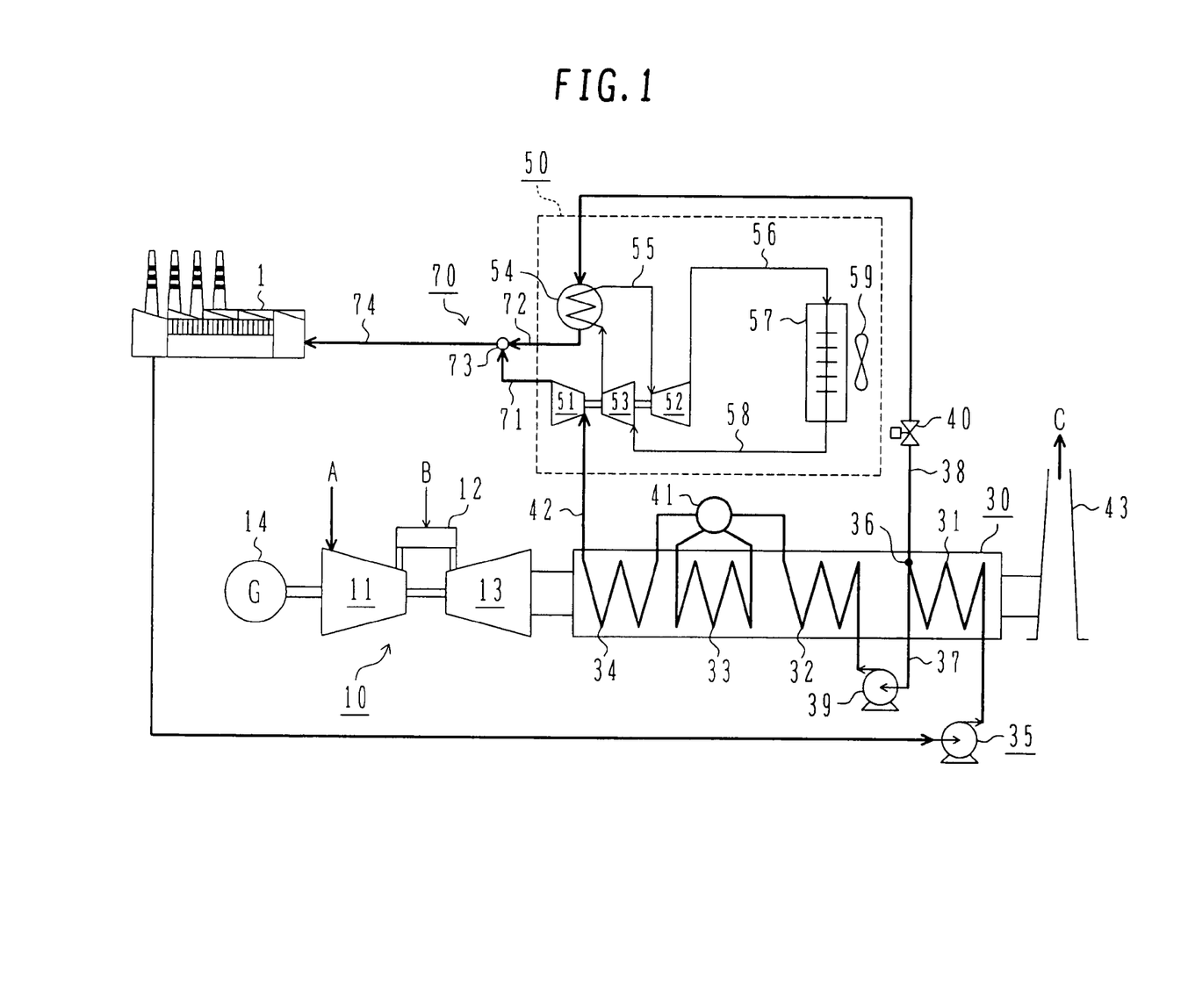
FIG. 1 is a system flowchart showing the overall arrangement of a heat energy supply system according to a first embodiment of the present invention.

FIG. 1 is a system flowchart showing the overall arrangement of a heat energy supply system according to a first embodiment of the present invention.

As shown in FIG. 1, the heat energy supply system of this embodiment comprises a gas turbine 10 serving as an engine for converting combustion energy to a driving force, a boiler (waste heat recovery boiler) 30 operated using, as a heating source, exhaust gas from the gas turbine 10, a heat pump 50 driven by steam from the boiler 30, and a steam supply line 70 for supplying steam produced by the heat pump 50 to a heat utilization facility 1.

(1-1,1) Arrangement of Gas Turbine 10

The gas turbine 10 comprises a compressor 11 for sucking and compressing the atmosphere (air) A, a combustor 12 for burning fuel B together with the compressed air from the compressor 11 and producing high-temperature, high-pressure exhaust gas, and a turbine 13 for obtaining rotatory power through expansion work of the exhaust gas from the combustor 12. The fuel used in the combustor 12 may be, for example, natural gas, town gas containing natural gas as a main component, lamp oil, light oil, or diesel fuel. In this embodiment, a generator 14 is coaxially coupled to the compressor 11. The rotatory power obtained from the turbine 13 is transmitted to the generator 14 for conversion to electrical energy. Note that, instead of the generator, other suitable load equipment, such as a pump, may be coupled to the gas turbine 10.

(1-1,2) Arrangement of Boiler 30

The boiler 30 heats a heat medium to produce steam by using the exhaust gas from the gas turbine 10. An outlet for the exhaust gas passing through the boiler 30 is connected to a stack 43. When it is required to reduce the nitrogen concentration in exhaust gas C released to the atmosphere through the stack 43, denitration equipment (not shown) filled with a catalyst is preferably installed in the boiler 30 so that most of nitrogen oxides contained in the exhaust gas C is decomposed to oxygen and nitrogen which are harmless.

The boiler 30 comprises four heat exchangers, i.e., a low pressure economizer 31, a high pressure economizer 32, a high pressure evaporator 33, and a high pressure super-heater 34, which are installed in this order from the downstream side in the direction of flow of the exhaust gas. In the boiler 30, heat energy contained in the exhaust gas is recovered by those four heat exchangers 31-34, thereby heating a heat medium supplied by a circulation pump 35. The circulation pump 35 has the function of supplying, to the boiler 30 in a circulating manner, the heat medium that has been supplied from the heat pump 50 to the heat utilization facility 1 and then condensed after being utilized as a heat source in the heat utilization facility 1. When the heat medium requires to be cleaned depending on the conditions in use of steam inside the heat utilization facility 1 or corrosion of piping, desalination equipment (not shown) filled with an ion exchange resin, for example, is preferably installed upstream of the circulation pump 35.

The heat medium introduced to the boiler 30 by the circulation pump 35 passes through the low pressure economizer 31, the high pressure economizer 32, the high pressure evaporator 33, and the high pressure super-heater 34 in this order. Pipes 37, 38 branched at a branch point 36 are connected to the low pressure economizer 31 at its downstream side in the direction of flow of the heat medium. The pipe 37 is connected to the high pressure economizer 32 through a high pressure pump 39, and the pipe 38 is connected to the heat pump 50 through a control valve 40. The high pressure economizer 32 and the high pressure evaporator 33 are connected to each other through a steam drum 41. The steam drum 41 is connected to the high pressure super-heater 34 positioned at the most downstream side in the direction of flow of the heat medium. Further, the high pressure super-heater 34 and the heat pump 50 are connected to each other through a pipe 42.

When the temperature of the exhaust gas lowers through the heat exchange with the heat medium in the heat exchangers 34, 33, 32 and 31, there arises a possibility that water vapor contained in the exhaust gas is condensed on a heat surface of the low pressure economizer 31, etc. and causes piping corrosion. Therefore, piping materials of the low pressure economizer 31, etc. are preferably made of stainless steel or plastic having superior corrosion resistance. Depending on cases, the low pressure economizer 31, etc. may be divided into an upstream part and a downstream part in the direction of flow of the exhaust gas, and only the downstream part subjected to lower temperatures may be made of stainless steel. Further, an exhaust gas outlet portion of the boiler 30 and an inner wall surface of the stack 43 may be lined with stainless steel or plastic.

(1-1,3) Arrangement of Heat Pump 50

The heat pump 50 comprises a steam turbine 51 driven by the heat medium (steam) supplied from the boiler 30 through the pipe 42, a two-phase flow expansion turbine 52 and a compressor 53 which are coaxially coupled to the steam turbine 51, and a heat exchanger (evaporator) 54 for heating the heat medium (for example, high temperature water), which has been preheated by the low pressure evaporator 31 in the boiler 30 and branched into the pipe 38 through the branch point 36, by utilizing external heat (such as waste heat from the heat utilization facility 1 or heat obtained from environment). The high pressure super-heater 34 is connected to the steam turbine 51 through the pipe 42, and the low pressure economizer 31 is connected to the heat exchanger 54 through the pipe 38.

A pipe 55 through which a heating medium for heating the heat medium supplied to the heat utilization facility 1 flows is disposed inside the heat exchanger 54. The pipe 55 is connected to the two-phase flow expansion turbine 52 at its downstream side in the direction of flow of the heating medium and to the compressor 53 at its upstream side. Also, the two-phase flow expansion turbine 52 is connected to an evaporator 57 through a pipe 56, and the evaporator 57 is connected to the compressor 53 through a pipe 58 so that the heating medium is circulated in a closed system. In this embodiment, trifluoroethanol (TFE), for example, is preferably used as the heating medium. As an alternative, the atmosphere or water (e.g., river water) may also be used if the temperature of the atmosphere or water can be increased to a level sufficient to heat the heat medium supplied to the heat utilization facility 1 to a setting temperature with pressure adjustment in the two-phase flow expansion turbine 52 and the compressor 53.

The evaporator 57 has the function of taking in external heat for application to the heating medium introduced to the heat exchanger 54. Thus, the heat exchanger 54 heats the heat medium (for example, high temperature water) from the boiler 30 through heat exchange of the external heat with the recovered heating medium. When the heat source has a low heat transfer rate such as the case of using, e.g., the atmosphere as the heat source, a fan 59 may be installed, as shown, to increase the heat exchanger efficiency between the environment and the heating medium.

(1-1,4) Arrangement of Steam Supply Line 70

The steam supply line 70 is a piping line for supplying the steam from the heat pump 50 to the heat utilization facility 1 as required. In this embodiment, the steam supply line 70 comprises a pipe 71 connected at its upstream end to an outlet (or an extraction port) of the steam turbine 51, a pipe 72 connected at its upstream end to the pipe 38 through the heat exchanger 54, a joining unit 73 connected to respective downstream ends of the pipes 71, 72, and a pipe 74 connecting the joining unit 73 and the heat utilization facility 1. In this embodiment, the steam discharged from the steam turbine 51 and the steam heated by the heat exchanger 54 are joined and mixed together in the joining unit 73 after passing through the pipes 71, 72, respectively, and are then supplied to the heat utilization facility 1.

(1-1,5) Construction of Heat Energy Supply System

When constructing the heat energy supply system of this embodiment, the entire system can be of course newly constructed, but if there is existing equipment such as an engine and a boiler, it is also possible to reconstruct the system by employing the existing equipment.

For example, if the gas turbine 10 already exists, the heat energy supply system is constructed as follows. The boiler 30 is connected to the gas turbine 10 so as to heat the heat medium by the exhaust gas from the gas turbine 10, thereby generating steam. The heat pump 50 is additionally installed and connected to the boiler 30 such that the steam turbine 51 is driven by the steam from the boiler 30 and the heat medium preheated by the boiler 30 is heated by the heat exchanger 54 to generate steam. Then, the heat pump 50 and the heat utilization facility 1 are connected to each other through the steam supply line 70 such that the steam discharged from the steam turbine 51 and the steam heated by the heat exchanger 54 are supplied to the heat utilization facility 1. The heat medium condensed after being utilized as a heat source in the heat utilization facility 1 is circulated to the boiler 30 by the circulation pump 35.

As another example, if the boiler 30 (or any other boiler) already exists, the heat energy supply system can be constructed by modifying the existing boiler to be supplied with the heat medium from the gas turbine 10, and then by installing the heat pump 50, the steam supply line 70, and the circulation pump 35 in a similar manner to that described above. While the heat medium branched from the heat medium for driving the steam turbine 51 is used as the heat medium supplied to the heat exchanger 54 of the heat pump 50 in this embodiment, different heat mediums from separate supply sources may be used for the steam turbine 51 and the heat exchanger 54 if there is another heat-medium supply source.

The operation of the heat energy supply system according to the present invention will be described below.

(1-2,1) Operation of Gas Turbine 10

When the atmosphere (air) A having been deprived of foreign matters through a filter (not shown) is sucked into the compressor 11, the air is compressed by the compressor 11 and pressurized to a setting pressure (e.g., about 8 atm). Simultaneously, the air sucked into the compressor 11 is heated under pressurization to a setting temperature (e.g., about 250° C.). The compressed air from the compressor 11 is burnt in the combustor 12 together with the fuel B, to thereby produce the high-temperature, high-pressure exhaust gas. When the exhaust gas is supplied to the turbine 13, the turbine 13 is given with rotatory power through expansion work of the exhaust gas, and the rotary power is transmitted to the generator 14 for conversion to electrical energy.

(1-2,2) Operation of Boiler 30

The boiler 30 is supplied with, as a heat source, the exhaust gas discharged from the turbine 13 after making the expansion work therein. The exhaust gas supplied to the boiler 30 has a high temperature (e.g., about 560° C.) near an outlet of the turbine 13, but the exhaust gas temperature gradually lowers through the successive heat exchanges with the heat medium supplied by the circulation pump 35 while passing through the heat exchangers 34, 33, 32 and 31 until the exhaust gas is discharged from the stack 43.

The heat medium at a predetermined temperature (e.g., about 30° C.), which has been condensed after being used as a heat source in the heat utilization facility 1, is first pressurized by the circulation pump 35 to a setting pressure (e.g., about 0.6 MPa). Then, the heat medium is supplied to the low pressure economizer 31 and is heated to a setting temperature (e.g., about 100° C.). Simultaneously, the pressure of the heat medium in the state of high temperature water is reduced to a predetermined pressure (e.g., about 0.5 MPa) due to pressure loss in the low pressure economizer 31. The heat medium is then distributed to the pipes 37, 38 through the branch point 36. A flow rate ratio at which the heat medium is distributed to the pipes 37, 38 at that time is adjusted depending on the opening degree of the control valve 40.

The heat medium introduced to the pipe 37 is pressurized to a setting pressure (e.g., about 5.4 MPa) by the high pressure pump 39, and is then heated to near a saturation temperature (269° C.) by the high pressure economizer 32. When the heat medium in the state of saturated water is supplied to the steam drum 41, it is heated by heat energy of the exhaust gas in the high pressure evaporator 33 in a naturally circulating manner for phase change into steam. Inside the steam drum 41, the saturated water and the saturated steam are separated from each other depending on density difference between them, and the saturated steam is transferred from an upper gas-phase region to the high pressure super-heater 34. The heat medium is heated and pressurized in the high pressure super-heater 34 to become super heat steam having a setting temperature and pressure (e.g., about 450° C. and about 5.0 MPa), and the heat medium in the form of super heat steam is supplied to the steam turbine 51 serving as a motive power source of the heat pump 50.

(1-2,3) Operation of Heat Pump 50

The heat medium (super heat steam) exiting the high pressure super-heater 34 at a setting pressure (e.g., about 5.0 MPa) performs expansion work in the steam turbine 51 and is discharged from the steam turbine 51 after being depressurized to a setting pressure (e.g., about 0.4 MPa) suitable for use as a heat source in the heat utilization facility 1. The rotatory power obtained by the steam turbine 51 is transmitted to the two-phase flow expansion turbine 52 and the compressor 53 for driving them.

The heating medium (e.g., TFE) flowing through the pipe 58 at a predetermined pressure (e.g., about 0.03 MPa) is compressed and pressurized to a setting pressure (e.g., about 1.1 MPa) by the compressor 53. The heating medium heated with the compression is supplied to the heat exchanger 54 for heat exchange with the heat medium that is supplied from the boiler 30 through the pipe 38 and has the predetermined temperature (e.g., about 100° C.). The heat medium is thereby evaporated to become saturated steam having a setting temperature and pressure (e.g., about 140° C. and about 0.4 MPa).

The heating medium having been subjected to the heat exchange in the heat exchanger 54 is condensed into a liquid, and when the liquid undergoes adiabatic expansion and is depressurized to a setting pressure (e.g., about 0.03 MPa) in the two-phase flow expansion turbine 52, a part of the liquid is evaporated and a two-phase flow is obtained at a lowered setting temperature (e.g., about 45° C.). Thus, because of such adiabatic expansion causing depressurization to the low pressure and the temperature drop, the heating medium in the heat pump 50 is able to absorb the external heat with very high efficiency. The heating medium in the state of the two-phase flow is heated by the evaporator 57 by, e.g., waste heat obtained from the heat utilization facility 1 at a predetermined temperature (e.g., about 50° C.) for phase change into vapor. If there is no suitable factory waste heat from the heat utilization facility 1, the pressure of the heat medium may be further reduced to be evaporated by heat of the atmosphere as described above. In that case, since the heat transfer efficiency of gas, such as the atmosphere, is relatively low, the heat exchange efficiency in the evaporator 57 can be increased by providing the fan 59, as shown, so that heat transfer is promoted.

(1-2,4) Operation of Steam Supply Line 70

The steam discharged from the steam turbine 51 and the steam obtained from the heat exchanger 54 are joined and mixed together in the joining unit 73 after passing through the pipes 71, 72, respectively, and are then supplied to the heat utilization facility 1 through the pipe 74 for use as a heat source therein. After being condensed upon release of the heat in the heat utilization facility 1, the heat medium is discharged from the heat utilization facility 1 and is returned to the circulation pump 35 through a proper cleaning process, as required. Then, the heat medium is supplied again to the boiler 30 by the circulation pump 35 in a circulating manner.

(1-3) Operating Advantages

With this embodiment, since the heat medium in a vapor (steam) state is supplied to the heat utilization facility 1, an energy amount transferable per unit medium weight can be drastically increased in comparison with the case of supplying the heat medium in a liquid state. Accordingly, power required for transporting heat can be reduced, thus resulting in that the installation place of the heat energy supply system is not limited to an area near the corresponding heat utilization facility 1 and a wide variety of applications can be realized. Further, since the heat pump 50 is employed to produce the steam supplied to the heat utilization facility 1, it is possible to take, into the system, not only the heat energy of the boiler 30, i.e., the fuel energy applied to the gas turbine 10, but also the waste heat of the heat utilization facility 1, which is released without being utilized, or heat energy infinitely present in environment, and to drastically increase the energy efficiency.

For example, if high temperature water of 100° C. is produced taking into account a temperature drop occurred during transport of the heat medium from the heat pump 50 to the heat utilization facility 1 on condition that the heat medium temperature required by the heat utilization facility 1 is 50° C., the amount of heat energy per unit weight of the heat medium transported is 0.21 MJ/kg by calculation. On the other hand, when steam of 100° C. is produced, the amount of heat energy per unit medium weight is 2.7 MJ/kg by calculation because of large latent energy. Stated another way, by supplying the heat medium in a steam state to the heat utilization facility 1, the amount of transported heat energy per unit medium weight is increased 13 times that resulting when the high temperature water is used.

Let here suppose, for example, the case where the heat medium is completely evaporated in the high pressure superheater 34 to produce steam at a setting temperature and pressure (e.g., about 450° C. and about 5.0 MPa) in the boiler 30. In this case, assuming that the temperature of the heat medium supplied to the low pressure economizer 31 is 30° C., the enthalpy of that heat medium is 125 kJ/kg. On the other hand, because the enthalpy of super heat steam at 450° C. is 3315 kJ/kg, calorie of 3190 kJ/kg has to be added to the heat medium in the boiler 30 in order to raise the temperature of the heat medium to 450° C. Assuming the heat medium to be saturated water at 269° C. at the time when the heat medium flows into the high pressure evaporator 33, calorie required for heating the heat medium from such a state to become the super heat steam at 450° C. through phase change is 2137 kJ/kg that is 67% of total exchanged calorie (3190 kJ/kg) required in the entire boiler 30.

On that occasion, to enable heat to be transferred from the exhaust gas to the heat medium (saturated water) in the high pressure evaporator 33, the temperature of the exhaust gas near the high pressure evaporator 33 must be 10° C. or more higher than the saturation temperature (269° C.), and therefore that exhaust gas is required to have at least a temperature of 279° C. In this case, assuming that the temperature of the exhaust gas immediately after being discharged from the turbine 13 is 560° C., it lowers by 281° C. until reaching 279° C. near the high pressure evaporator 33.

On the other hand, calorie required for heating the heat medium supplied to the boiler 30 at 30° C. to 269° C. until the heat medium flows into the high pressure evaporator 33 is 1178 kJ/kg. This calorie is as small as about 50% of the calorie (2137 kJ/kg) required for raising the temperature of the heat medium from 269° C. to 450° C., and the temperature of the exhaust gas is lowered just to about 140° C. at the exhaust gas outlet of the boiler 30. In this case, therefore, heat energy corresponding to the difference between the temperature (140° C.) of the exhaust gas at the outlet of the boiler 30 and the atmospheric temperature is released to the atmosphere without being utilized, thus resulting in energy loss.

In this embodiment, to eliminate such energy loss and to effectively utilize the calorie of the exhaust gas C which is released to the atmosphere without being utilized, 45% of the heat medium (at, e.g., about 100° C.) obtained as the high temperature water in the low pressure economizer 31 is branched and supplied to the heat exchanger 54 in the heat pump 50. As a result, the heat medium to be heated by the heat pump 50 can be preheated by utilizing the calorie of the exhaust gas C released to the atmosphere without being utilized, and the energy efficiency of the heat pump 50 can be further increased. Also, the temperature of the exhaust gas C released to the atmosphere can be lowered and hence heat energy loss can be reduced. For example, when the heat medium supplied to the boiler 30 at 30° C. is heated to about 100° C. by the low pressure economizer 31, the temperature of the exhaust gas C released to the atmosphere is lowered from 140° C. to a level nearer to the atmospheric temperature (e.g., about 60° C. or below), and the fuel energy applied to the combustor 12 is substantially all recovered.

Energy consumption efficiency, i.e., coefficient of performance (COP), indicating the performance of the heat pump 50 is defined as a ratio of the motive power applied to the heat pump 50 by the compressor 53 to the calorie applied to the steam produced by the heat exchanger 54. Calorie used for heating the heat medium in the heat exchanger 54 is expressed by a total of the calorie recovered into the heat medium from the exterior by the evaporator 57 and the motive power used by the compressor 53 for pressurizing the heating medium. When overall system efficiency is calculated by setting the fuel energy applied to the combustor 12 as a denominator and a total of the amount of electric power generated by the generator 14 and the calorie supplied to the heat utilization facility 1 as a numerator with the COP value being a parameter, the overall system efficiency exceeds 100% if the COP value exceeds 1.7, and becomes 128% if the COP value is increased to 5. This is resulted from the effect obtained by taking in the heat energy by the evaporator 57 from the exterior in addition to the fuel energy applied to the combustor 12. Further, the motive power used by the circulation pump 35 and the high pressure pump 39 in the boiler 30 also contributes to heating the heat medium.

Thus, while the overall efficiency of a general cogeneration system is about 80%, the overall efficiency of the heat energy supply system of this embodiment is notably higher than 80%. By calculation, the heat energy supply system of this embodiment is able to cut the amount of $CO_2$, which is generated from the system and adversely affects the global warming, about 37% as compared with the general cogeneration system having the overall efficiency of 80%. The heat loss in the heat energy supply system of this embodiment is expressed by calorie corresponding to the temperature difference between the exhaust gas C released to the atmosphere from the boiler 30 and the atmosphere A sucked into the compressor 11. Accordingly, the overall efficiency of the heat energy supply system of this embodiment exceeds 100% by taking in larger calorie by the evaporator 57 from the exterior than that heat loss.

Further, in this embodiment, the motive power obtained by the steam turbine 51 is all used as forces for driving the compressor 53 and the two-phase flow expansion turbine 52 in the heat pump 50 without converting the motive power obtained by the steam turbine 51 to electric power. There is hence no loss attributable to conversion to electric power in the heat pump 50. In addition, since the steam discharged from the steam turbine 51 and the steam produced by the heat pump 50 are mixed and transported to the heat utilization facility 1 through the common steam pipe 74, a larger amount of heat medium can be supplied to the heat utilization facility 1 without causing loss. Those points are also major advantages with the heat energy supply system of this embodiment.

Another major advantage is that, when there is existing equipment releasing unused waste heat to the atmosphere, such as an engine and a boiler, the heat energy supply system of this embodiment can be constructed with ease by employing such existing equipment.

(2) Second Embodiment

Figure 2:
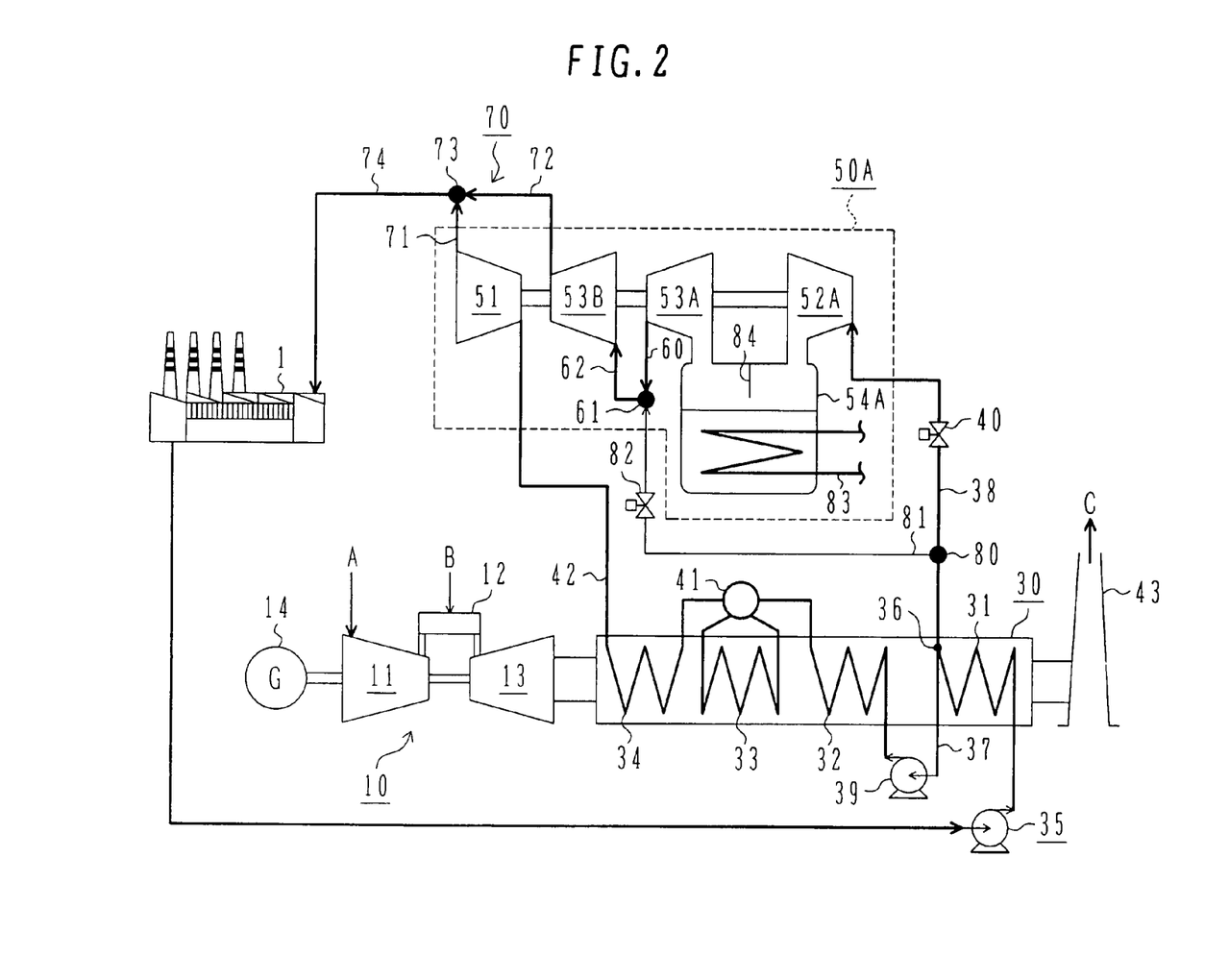
FIG. 2 is a system flowchart showing the overall arrangement of a heat energy supply system according to a second embodiment of the present invention.

FIG. 2 is a system flowchart showing the overall arrangement of a heat energy supply system according to a second embodiment of the present invention. Note that, in FIG. 2, similar components to those in FIG. 1 are denoted by the same reference numerals, and a duplicate description of those components is omitted here.

As shown in FIG. 2, this second embodiment differs from the first embodiment in the arrangement of a heat pump 50A, namely in that the heat medium from the boiler 30 is supplied to a heat medium cycle for the heat pump 50A without using the above-mentioned different heating medium, such as TFE, and steam obtained in the heat medium cycle is supplied to the heat utilization facility 1. As a result, a heat exchanger for making heat exchange between the heat medium supplied to the heat utilization facility 1 and the heating medium for heating the former (i.e., the heat exchanger 54 in FIG. 1) is omitted.

The heat pump 50A comprises the steam turbine 51 driven by the heat medium (steam) supplied from the boiler 30 through the pipe 42, a two-phase flow expansion turbine 52A and compressors 53A, 53B which are coaxially coupled to the steam turbine 51, and a heat exchanger (evaporator) 54A for heating the heat medium (high temperature water), which is supplied from the boiler 30 through the pipe 38, by utilizing external heat (such as waste heat from the heat utilization facility 1 or heat obtained from environment).

In this embodiment, the pipe 38 extending from the low pressure economizer 31 is connected to the two-phase flow expansion turbine 52A. The two-phase flow expansion turbine 52A is connected to the compressor 53A in the upstream stage through the heat exchanger 54A, and the compressor 53A is connected to the compressor 53B in the downstream stage through a pipe 60, a mixer 61, and a pipe 62. Further, a branch point 80 is provided in the pipe 38 connecting the low pressure economizer 31 and the two-phase flow expansion turbine 52A to each other, and a pipe 81 branched from the pipe 38 at the branch point 80 is connected to the mixer 61. A control valve 82 is disposed in the pipe 81, and a flow rate ratio at which the heat medium is distributed to the pipes 38, 81 is adjusted depending on the opening degree of the control valve 82.

The heat exchanger 54A includes a pipe 83 disposed therein for passage of, e.g., the wastewater of the heat utilization facility 1 or the atmosphere. A partition 84 is disposed inside the heat exchanger 54A such that an upper space in the heat exchanger 54A is divided into two parts on the side closer to the two-phase flow expansion turbine 52A and on the side closer to the compressor 53A.

The remaining arrangement is the same as that of the above-described first embodiment, and this second embodiment can also provide the same advantages as those obtained with the first embodiment. Further, the heat energy supply system of this second embodiment can be constructed by utilizing the existing engine and boiler in a similar way. In addition, this second embodiment can provide the operating advantages as follows.

Since the heat medium supplied from the boiler 30 is used as the medium in the heat pump 50A in this embodiment, the two-phase flow expansion turbine 52A can produce a larger motive force, for example, by designing the system in which the heat medium heated to a state substantially under the saturation conditions flows into the two-phase flow expansion turbine 52A.

For example, when the heat medium is prepared at the outlet of the low pressure economizer 31 in the boiler 30 as high temperature water at about 130° C. and 0.5 MPa, i.e., a state near the saturation conditions, the opening degree of the control valve 82 is adjusted such that the heat medium is supplied to the two-phase flow expansion turbine 52A through the branch point 80 at a proportion of 80% and the supplied heat medium is depressurized to about 0.01 MPa at 46° C. by the two-phase flow expansion turbine 52A. The heat medium supplied to the heat exchanger 54A is evaporated at a predetermined proportion (e.g., about 14%) during the expansion process in the two-phase flow expansion turbine 52A so as to form a two-phase flow, and the liquid phase separated from the steam phase is accumulated in a lower portion of the heat exchanger 54A. In this case, the liquid phase is heated and evaporated by utilizing factory waste heat or town waste heat at about 50-60° C. When the outlet pressure of the two-phase flow expansion turbine 52A is further reduced (for example, to about 0.002 MPa), the temperature in the heat exchanger 54A is correspondingly further lowered (for example, to about 18° C.). In such a case, the heat medium can be evaporated by utilizing heat of the infinitely existing atmosphere.

The steam present in the upper space of the heat exchanger 54A at a predetermined pressure (e.g., about 0.01 MPa) is pressurized (for example, to about 0.4 MPa) by the compressors 53A, 53B and is supplied as a heat source to the heat utilization facility 1. In the mixer 61 disposed between the compressor 53A in the upstream stage and the compressor 53B in the downstream stage, the heat medium in the state of high temperature water is sprayed through the pipe 81 branched from the branch point 80 to lower the temperature of the heat medium supplied from the compressor 53A to the compressor 53B.

The reason is that when compressing steam of 0.01 MPa to 0.4 MPa, for example, unless the steam is cooled midway, the steam temperature reaches about 490° C. even if the compression efficiency is 100%, and reaches about 550° C. if the compression efficiency is 85%. In the latter case, energy corresponding to the temperature difference between the saturation temperature, i.e., 46° C., of the heat medium (water) at 0.01 MPa and 550° C. is required as motive power for driving the compressors 53A, 53B. In compression of gas, the lower gas density, the larger is motive power required for the compression. In view of the above, the flow rate of the heat medium is adjusted by the control valve 82 so that the high temperature water of 0.5 MPa is branched from the branch point 80 and poured into the mixer 61 for spray to the steam during the compression process, thereby lowering the steam temperature.

In this embodiment, the two compressors 53A, 53B are installed and the mixer 61 is disposed between them. For the purpose of reducing the motive power required for driving the compressors, however, it is also conceivable to install three or more compressors and to dispose a mixer between every two adjacent compressors.

With this embodiment, as described above, by spraying the steam to the heat medium in the state of super heat steam flowing out of the compressor 53A, the temperature of the super heat steam can be easily lowered to the saturation temperature. Alternatively, in the step of spraying the heat medium, the heat steam may be sprayed until the steam is slightly humidified. In this case, the heat medium is in the state of humid steam at the inlet of the compressor 53B in the downstream stage, but water droplets are evaporated inside the compressor 53B. Thus, a temperature rise in the compressor 53B can be suppressed and the motive power required for driving the compressors can be reduced as a whole. From the viewpoint of obtaining higher efficiency, an amount of the heat medium sprayed in the mixer 61 is preferably adjusted such that the steam temperature at the outlet of the compressor 53B is held at the temperature (e.g., about 140° C.) utilized by the heat utilization facility 1.

The motive power used by the compressors 53A, 53B is supplied from the steam turbine 51 and the two-phase flow expansion turbine 52A. Since the heat medium supplied to the heat utilization facility 1 is used as the medium in the heat pump 50A, it is possible to cool the heat medium by directly spraying the branched heat medium at the midpoint between the compressors 53A, 53B, and to omit a large-sized heat exchanger (i.e., the heat exchanger 54 in the embodiment of FIG. 1) which is required when the heat medium is indirectly cooled by using the dedicated heating medium, such as TFE. Because the weight of the two evaporators 54, 57 occupies half or more of the total weight of the heat pump 50 shown in FIG. 1, the omission of one of those two evaporators like this embodiment greatly contributes to simplifying the equipment arrangement. Further, when the heat medium is heated through the heat exchange with another heating medium, such as TFE, the temperature difference is required between the heat medium to be heated and the heating medium for heating the former. However, that temperature difference is no longer required and higher efficiency can be obtained correspondingly.

Moreover, in this embodiment, the pressure in the heat exchanger 54A is low (e.g., about 0.01 MPa) and the fluid density at each of the outlet of the two-phase flow expansion turbine 52A and the inlet of the compressor 53A is relatively small. Accordingly, by connecting the outlet of the two-phase flow expansion turbine 52A and the inlet of the compressor 53A to the upper space in the heat exchanger 54A as shown FIG. 2, the need of arranging a pipe to increase the fluid speed midway can be eliminated. In addition, since the interior of the heat exchanger 54A is divided by the partition 84 into two parts, water droplets at the outlet of the two-phase flow expansion turbine 52A can be prevented from directly flowing into the compressor 53A. The liquid phase remains at a standstill inside the heat exchanger 54A. If the heat exchange efficiency between the liquid phase and the pipe 83 is poor, it is more preferable to install a stirrer (not shown) for causing the liquid phase to flow in a forcible manner and to provide an internal partition (not shown) so that a uniform flow is formed and heat conduction is promoted.

(3) Third Embodiment

Figure 3:
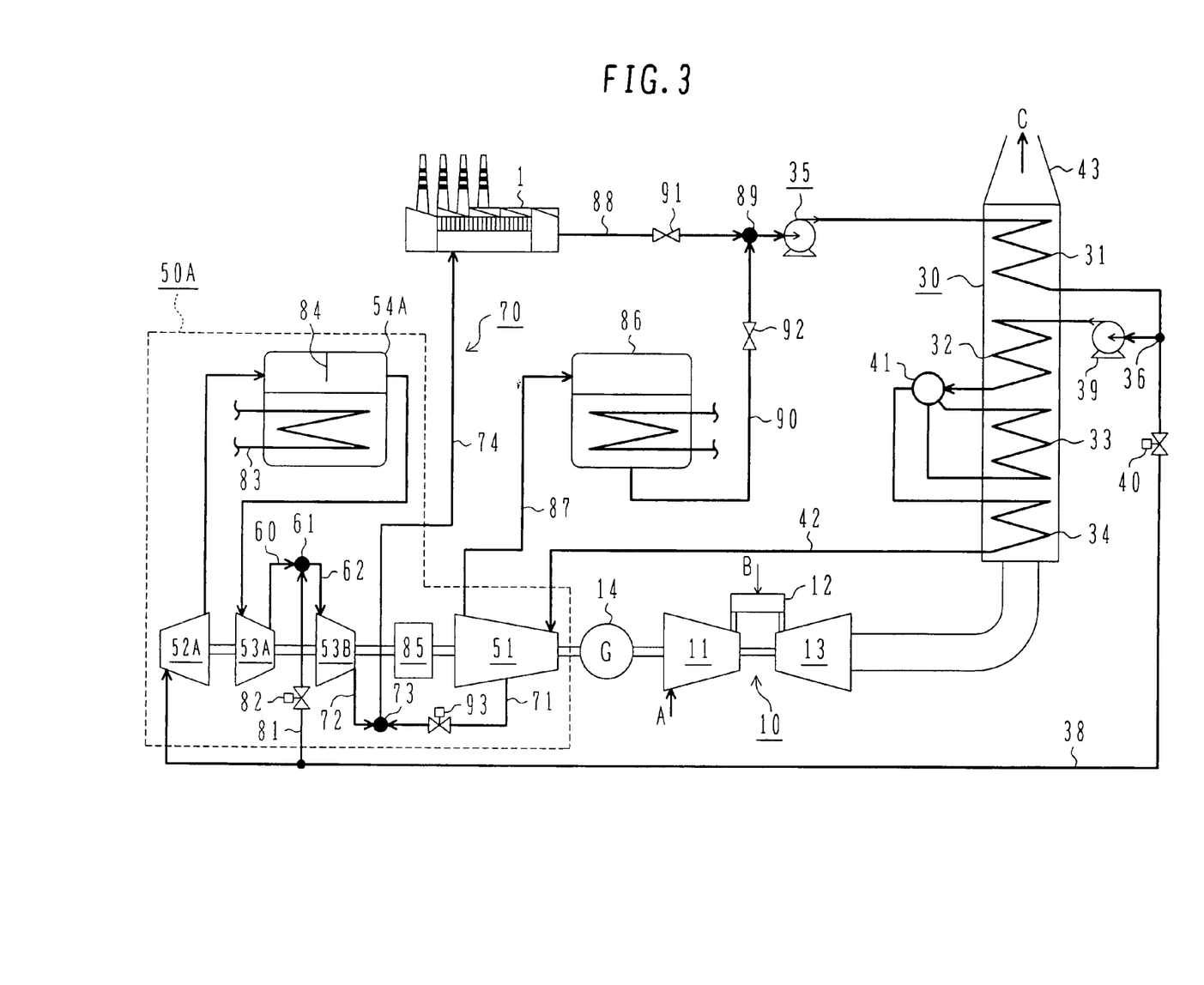
FIG. 3 is a system flowchart showing the overall arrangement of a heat energy supply system according to a third embodiment of the present invention.

FIG. 3 is a system flowchart showing the overall arrangement of a heat energy supply system according to a third embodiment of the present invention. Note that, in FIG. 3, similar components to those in the above-referenced drawings are denoted by the same reference numerals, and a duplicate description of those components is omitted here.

As shown in FIG. 3, this third embodiment differs from the foregoing embodiments in that a ratio of generated power output to thermal output is made variable, i.e., that respective drive shafts of the steam turbine 51 and the compressor 53B are coupled to each other through a variable speed reducer 85.

Also, a condenser 86 for condensing the steam discharged from the steam turbine 51 after performing expansion work therein is connected to the outlet of the steam turbine 51 through a pipe 87. The condenser 86 is connected through a pipe 90 to a joining unit 89 disposed in a pipe 88 interconnecting the heat utilization facility 1 and the circulation pump 35. Control valves 91, 92 are disposed respectively in the pipes 88, 90. Further, a control valve 93 is disposed in a pipe 71 interconnecting the extraction port of the steam turbine 51 and the joining unit 73.

The remaining arrangement is the same as that of the above-described second embodiment, and this third embodiment can also provide the same advantages as those obtained with the second embodiment. Further, the heat energy supply system of this third embodiment can be constructed by utilizing the existing engine and boiler in a similar way. In addition, this third embodiment can provide the operating advantages as follows.

The compressors 53A, 53B are coaxially coupled to not only the two-phase flow expansion turbine 52A and the steam turbine 51, but also to the gas turbine 10. Therefore, the rotatory power produced from the turbine 13 can be utilized as the motive power for driving the compressors 53A, 53B. The motive power remained after driving the compressors 53A, 53B is converted to electrical energy by the generator 14.

A ratio of heat to electric power required in the heat utilization facility 1, etc. varies. Corresponding to such a variation, the system of this embodiment is able to continuously change a proportion of heat supply with respect to the total amount of supplied energy from 0% (supply of electric power: 100%) to 100% (supply of electric power: 0%).

When only electric power is supplied, the control valve 40 is closed to make 0 (zero) the flow rate of steam produced by the heat pump 50A (heat exchanger 54A). In this state, the rotation speed of the circulation pump 35 is controlled to be matched with the conditions of super heat steam that is finally produced by the high pressure super-heater 34 in the boiler 30, thereby adjusting the amount of the heat medium supplied to the boiler 30. When the control valve 40 is closed and no heat medium is introduced to the pipe 38 like this case, the temperature of the exhaust gas C discharged from the boiler 30 rises.

Here, the amount of the heat medium supplied by the circulation pump 35 can be decided by dividing the calorie given to the heat medium in the boiler 30 by the calorie required per unit flow rate. The calorie given to the heat medium in the boiler 30 can be calculated from both the temperature difference of the exhaust gas between the outlet of the turbine 13 and the outlet of the boiler 30 and the flow rate of the exhaust gas discharged from the turbine 13. The calorie required per unit flow rate can be obtained from the difference between the enthalpy of the heat medium at the outlet of the circulation pump 35 and the enthalpy of the heat medium at the outlet of the high pressure super-heater 34.

By closing the control valve 93 to cut off the supply of the heat medium extracted from the steam turbine 51 to the heat utilization facility 1 and opening the control valve 92, the heat medium used for driving the steam turbine 51 is all supplied to the condenser 86 and condensed for return to water. Because no heat medium flows into the two-phase flow expansion turbine 52A and the compressors 53A, 53B, the energy loss can be reduced by disconnecting the variable speed reducer 85 such that it is released from the state coupled to the steam turbine 51.

On the other hand, when electric power and heat are supplied to the heat utilization facility 1 at the same time, proportions of the flow rate of the heat medium supplied to the heat pump 50 and the high pressure economizer 32 through the branch point 36 are adjusted by controlling the opening degree of the control valve 40 and the rotation speed of the circulation pump 35. The flow rate of the heat medium sprayed to the heat medium in the state of super heat steam at the midpoint between the compressors 53A, 53B is adjusted by controlling the opening degree of the control valve 82 so that the heat medium is sprayed at a constant ratio with respect to the flow rate of the heat medium flowing into the compressor 53B.

Because the performance of the heat pump 50A is decided depending on the pressure in the evaporator 54A, the rotation speeds of the compressors 53A, 53B are controlled by the variable speed reducer 85 so as to hold the pressure in the evaporator 54A at a predetermined value. During a period in which a heat demand is small, the control valve 93 is closed to maximize the output of the steam turbine 51. If there is a demand requiring a further increase of the thermal output after the flow rate of the heat medium flowing through the two-phase flow expansion turbine 52A has increased to a level at which the evaporator 54A can sufficiently develop its capability of evaporating the heat medium, the opening degree of the control valve 93 is enlarged to increase the flow rate of the heat medium introduced to the joining unit 73. By enlarging the opening degree of the control valve 93, the flow rate of the heat medium introduced to the joining unit 73 is increased correspondingly, while the output of the steam turbine 51 is reduced and so is the amount of electric power generated by the generator 14 in a reverse proportional relation. At the time when the amount of generated electric power becomes 0 (zero), the thermal output in the entire system is maximized.

When the steam discharged from the steam turbine 51 is introduced to the condenser 86 and condensed therein, the resulting condensation heat is recovered by cooling water and released to the exterior. Accordingly, the heat loss of the system is given by the calorie of the exhaust gas C discharged through the stack 43 and such condensation heat. In the state where the control valve 92 is closed and no heat medium flows into the condenser 86 under the conditions of maximizing heat energy, the overall energy efficiency of the system shows a maximum value.

In the case of supplying energy only as thermal output, a percentage of energy of the heat medium capable of being supplied to the heat utilization facility 1 with respect to fuel energy supplied to the combustor 12 is in the range of 180-220% depending on the temperature of waste heat available by the evaporator 54A and the efficiencies of the compressors 53A, 53B. Steam energy available in a general boiler is about 90% of input fuel energy and never exceeds 100%. In the system of this embodiment, since the motive power produced by the gas turbine 10 is also used as a driving force for the heat pump 50A, the total energy amount capable of being supplied to the heat utilization facility 1 is able to exceed 200% depending on the conditions by employing not only the fuel energy supplied to the combustor 12, but also energy of the atmosphere or waste heat utilized by the evaporator 54A.

(4) Fourth Embodiment

Figure 4:
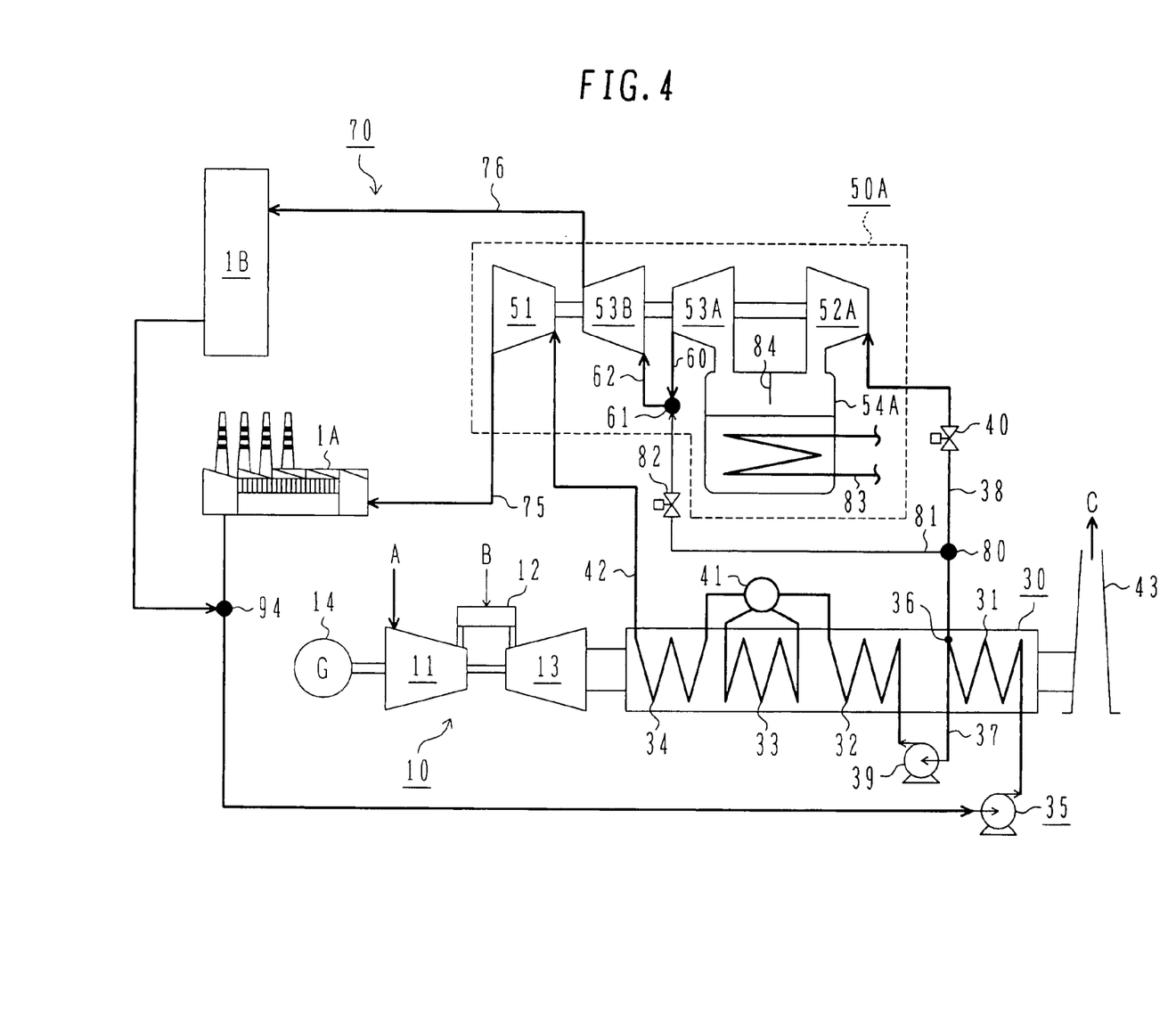
FIG. 4 is a system flowchart showing the overall arrangement of a heat energy supply system according to a fourth embodiment of the present invention.

FIG. 4 is a system flowchart showing the overall arrangement of a heat energy supply system according to a fourth embodiment of the present invention. Note that, in FIG. 4, similar components to those in the above-referenced drawings are denoted by the same reference numerals, and a duplicate description of those components is omitted here.

As shown in FIG. 4, this fourth embodiment differs from the foregoing embodiments in that the steam discharged from the steam turbine 51 after performing expansion work therein and the steam heated by the heat exchanger 54A are supplied to corresponding different heat utilization facilities 1A, 1B, respectively.

In this fourth embodiment, the steam supply line 70 includes a pipe 75 interconnecting the steam turbine 51 and a heat utilization facility 1A, e.g., a factory, and a pipe 76 interconnecting the compressor 53B and another heat utilization facility 1B, e.g., a heated swimming pool. The heat medium used for driving the steam turbine 51 and the heat medium heated by the heat exchanger 54A are supplied respectively to the heat utilization facilities 1A, 1B through the pipes 75, 76. The heat mediums having been utilized as heat sources in the heat utilization facilities 1A, 1B and condensed are discharged from the heat utilization facilities 1A, 1B and then joined with each other by a joining unit 94 for return to the circulation pump 35.

The remaining arrangement is the same as that of the above-described second embodiment, and this fourth embodiment can not only provide the same advantages as those obtained with the second embodiment, but also supply the heat mediums to a plurality of heat utilization facilities as required. Further, the heat energy supply system of this fourth embodiment can be constructed in a similar way. While this fourth embodiment has been described in connection with the case of supplying energy to a plurality of heat utilization facilities in the system according to the second embodiment, the arrangement of this fourth embodiment is also applicable to the case of supplying energy to a plurality of heat utilization facilities in the systems according to the other above-described embodiments.

(5) Fifth Embodiment

Figure 5:
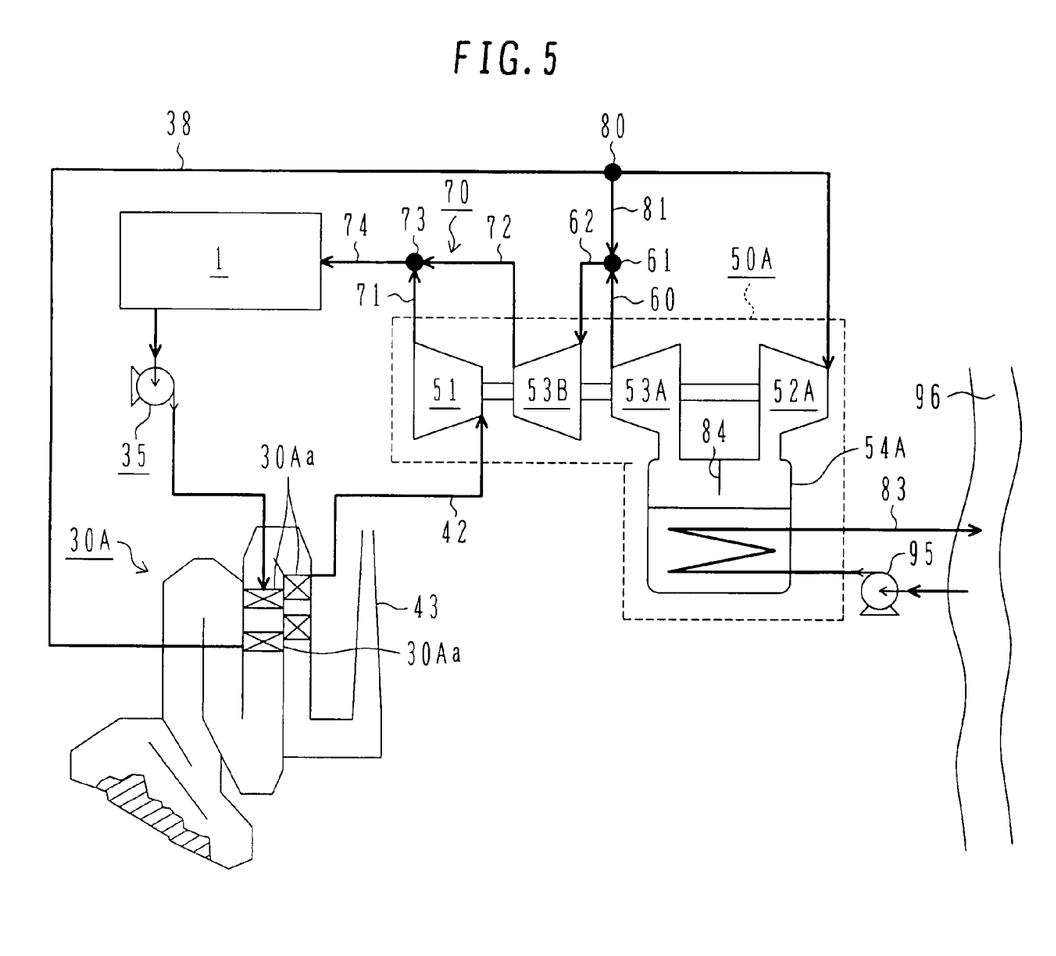
FIG. 5 is a system flowchart showing the overall arrangement of a heat energy supply system according to a fifth embodiment of the present invention.

FIG. 5 is a system flowchart showing the overall arrangement of a heat energy supply system according to a fifth embodiment of the present invention. Note that, in FIG. 5, similar components to those in the above-referenced drawings are denoted by the same reference numerals, and a duplicate description of those components is omitted here.

As shown in FIG. 5, this fifth embodiment differs from the foregoing embodiments in that, instead of waste heat of an engine (such as the gas turbine 10), a boiler 30A installed in any of various facilities, e.g., a sanitation factory, is employed as a heat source for generating the steam (heat medium) to drive a heat pump 50A. While one example of the boiler 30A is an incinerator boiler in the sanitation factory, the boiler 30A is not limited to such an example and may be any other boiler so long as it is able to heat a heat medium for conversion to steam, e.g., a boiler using heavy oil or tires as fuel. In this embodiment, water pumped up from a river 96 by a pump 95 is introduced to the heat exchanger 54A as a heating medium used in the heat pump 50A to heat the heat medium. In the thus-arranged system of this embodiment, heat energy is supplied to the heat utilization facility 1, such as a heated swimming pool, with high efficiency by adding calorie obtained from the river water to calorie obtained from a heat exchanger 30Aa which is disposed in the boiler 30A.

The heat medium returned from the heat utilization facility 1 is pressurized to a setting pressure (e.g., about 7 MPa) by the circulation pump 35 and then supplied to the boiler 30A for heating in the heat exchanger 30Aa. The heat medium coming into the state of high-temperature, high-pressure water is supplied to an expansion turbine 52A through a pipe 38, and the heat medium coming into the state of high-pressure super heat steam is supplied through a pipe 42 to the steam turbine 51 for driving the heat pump 50A. In the case of the heat medium being water, when the water is expanded to about 0.002 MPa by the expansion turbine 52A, it can be evaporated by heat infinitely obtained from the river 96 because the saturation temperature lowers to 17.5° C. The water of the river 96 is supplied to the heat exchanger 54A through a pipe 83 by the pump 95. If the river water is highly contaminated, a filter is disposed in the pipe 83 to remove insoluble materials.

The evaporated saturated steam is compressed to a setting pressure (e.g., about 0.4 MPa) by the compressors 53A, 53B. In order to reduce compression motive forces to be applied from the compressors 53A, 53B, the heat medium in the state of high temperature water is sprayed to cool the steam at the midpoint between the compressors 53A, 53B. The motive power for driving the compressors 53A, 53B is provided by energy produced when the heat medium in the state of super heat steam at the setting pressure (e.g., about 7 MPa) is depressurized by the steam turbine 51 to a pressure (e.g., about 0.4 MPa) suitable for use in the heat utilization facility 1. The steam exiting the steam turbine 51 and the steam exiting the compressor 53B are mixed with each other in the joining unit 73 and supplied as a heat source to the heat utilization facility 1.

This fifth embodiment can also provide the same advantages as those obtained with the foregoing embodiments, and the heat energy supply system of this fifth embodiment can be constructed in a similar way by using the existing boiler. By utilizing the heat of the river 96 as well, the calorie capable of being supplied from the same boiler 30A can be increased about 1.8 times depending on the conditions as compared with the system in which only the steam generated by the existing boiler 30A is supplied to the heat utilization facility 1.

While the foregoing embodiments have been described in connection with the case of using water as the heat medium supplied to the heat utilization facility, other suitable medium, such as carbon dioxide, ammonia or trifluoroethanol (TFE), may also be used as the heat medium because the heat medium is circulated in a closed system and will not flow out to the exterior. As a matter of course, although those other mediums may be each used alone, they may also be used in mixed form of several kinds of mediums or mixed with water. Further, when a harmless and mixable medium is used as the heat medium, the closed system is not essential. In such a case, the heat medium for driving the steam turbine 51 and the heat medium heated by the heat pump 50 or 50A may be supplied from different supply sources. In the case of using plural kinds of heat mediums, when the heat medium for driving the steam turbine 51 and the heat medium heated by the heat pump 50 or 50A are supplied to different heat utilization facilities and circulated in respective closed systems, both the heat mediums are not necessarily required to be mixable.

(6) Sixth Embodiment

In the system of FIG. 1, the heat medium having been utilized in the heat utilization facility 1 is condensed and returned to the circulation pump 35. On the other hand, this sixth embodiment is featured in omitting the pipe through which the heat medium having been utilized as a heat source in the heat utilization facility 1 and condensed is supplied to the boiler 30 in a circulating manner, and in supplying the heat medium to the circulation pump 35 from other supply source than the heat utilization facility 1.

It is supposed that, instead of utilizing only the steam (heat medium) supplied from the steam supply line 70, the heat utilization facility 1 employs the steam in a reaction process. The steam having been used in the reaction process has a difficulty in directly circulating it to the heat pump for reuse. In this embodiment, therefore, the pipe through which the heat medium having been utilized as a heat source in the heat utilization facility 1 and condensed is supplied to the boiler 30 in a circulating manner is not disposed, and water from other supply source, e.g., a river or the underground, than the heat utilization facility 1 is cleaned and supplied to the circulation pump 35. With such a system arrangement, because of no need of installing the return pipe from the heat utilization facility 1 to the circulation pump 35, an effect of cutting the installation cost is increased as the distance between the heat pump 50 and the heat utilization facility 1 increases.

(7) Seventh Embodiment

In the second embodiment shown in FIG. 2, the heat medium supplied to the heat utilization facility 1 is also employed as the heat medium for use in the heat pump 50. This seventh embodiment uses water as the common heat medium.

Figure 6:
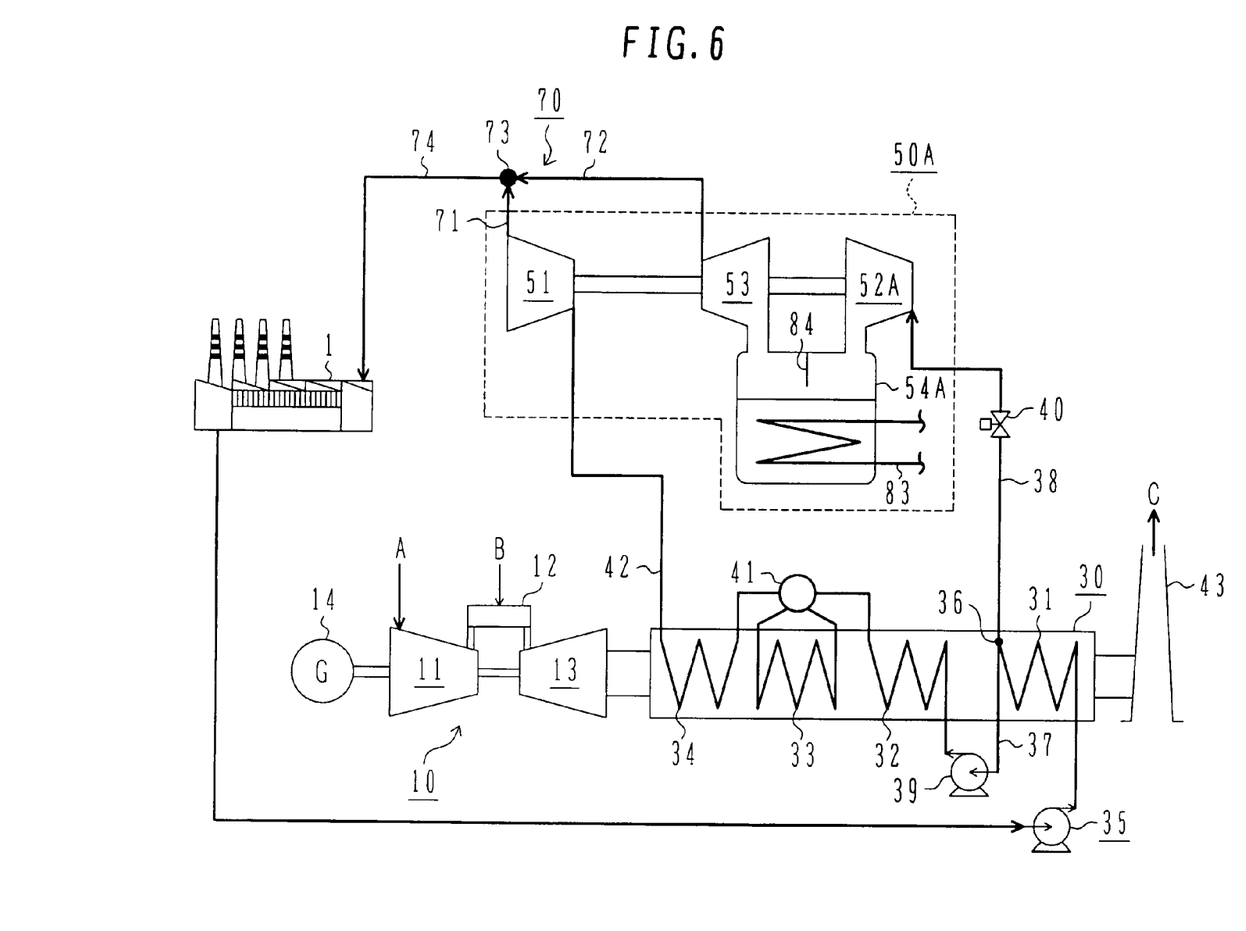
FIG. 6 is a system flowchart showing the overall arrangement of a heat energy supply system utilizing water as a heat medium, the system including a known heat pump.

The following description is made in comparison with a system arrangement in which the heat pump has the same arrangement as that of a known heat pump and the heat medium is just replaced with water. FIG. 6 is a system flowchart showing the overall arrangement of a heat energy supply system utilizing water as the heat medium, the system including the known heat pump. Comparing with FIG. 2 described above, the heat pump 50A includes one compressor 53, and does not include the mixer 61 connected to the pipe branched from the pipe 38 interconnecting the low pressure economizer 31 and the two-phase flow expansion turbine 52A. In the system of FIG. 6, when gas is compressed by the compressor 53 of the heat pump 50A, a larger temperature rise is caused as the gas has lower density. For example, the density of steam at 0.01 MPa and 46° C. is 0.068 kg/m$^3$ that is just 13% of 0.52 kg/m$^3$, i.e., the density of R-11 as one of coolants. In the case of using R-11, therefore, even when it is compressed to 0.4 MPa, the temperature rises up to just 185° C. On the other hand, when the steam is compressed to the same level, the temperature rises up to 490° C. Because the saturation temperature of water at 0.4 MPa is 144° C., the motive power required for raising the temperature from 144° C. to 490° C. is merely converted to heat, thus resulting in a significant reduction of the system efficiency. Thus, the system having the same arrangement as that of the known heat pump and simply employing water as the heat medium accompanies a large efficiency reduction and hence has a difficulty in putting it into practical use.

To avoid that problem, in this embodiment using water as the heat medium in the heat pump, the system has to be modified as shown in FIG. 2. More specifically, the compressor 53 of the heat pump 50A is divided into plural stages, and the steam is cooled to increase density at the intermediate between the divided compressor stages, thereby reducing the compression motive power required.

A manner of cooling the steam at the intermediate between the divided two compressor stages can be realized by not only spraying water to the steam as described above, but also installing a heat exchanger. In the latter case, although the heat exchanger is installed outside containers for the compressors 53A, 53B and hence the equipment size is enlarged, the steam temperature can be adjusted with higher accuracy.

In addition to simple condensation of the steam to be utilized as heat, the heat utilization facility 1 can also utilize the steam in other ways as follows. First, an absorption freezer using lithium bromide as a coolant is installed in the heat utilization facility, and high temperature steam is utilized to evaporate the coolant, thereby cooling the heat utilization facility. Secondly, the steam is directly injected or sprayed to products in a chemical process or a drying process. In this case, the heat utilization facility 1 is not required to include the condenser for condensing the steam.

What is claimed is:
1. A heat energy supply system for supplying a heat medium to a heat utilization facility, the system comprising:
   a boiler for heating the heat medium;

a heat pump including a steam turbine driven by steam obtained by heating the heat medium in said boiler, a heat exchanger for heating the heat medium by employing waste heat or heat obtained from environment, thereby producing the steam at a setting temperature, and a compressor for compressing the steam produced by said heat exchanger, said compressor being coaxially coupled with said steam turbine; and a steam supply line for supplying the steam discharged from said steam turbine and the steam produced by said heat exchanger to said heat utilization facility, and wherein the motive power for driving the heat pump is provided by energy produced when the heat medium in a state of super heat steam at the setting pressure from the boiler is depressurized by the steam turbine to a pressure suitable for use in the heat utilization facility.

2. The heat energy supply system according to claim 1, wherein said heat pump further includes an expansion turbine for expanding the heat medium supplied from said boiler and supplying the expanded heat medium to said heat exchanger, said expansion turbine being coaxially coupled with said compressor and said steam turbine.

3. The heat energy supply system according to claim 2, wherein the system further comprises two compressors and a mixer for supplying the heat medium to a steam flowing line between said compressors.

4. The heat energy supply system according to claim 1, wherein said steam supply line includes a joining unit for joining and mixing the steam discharged from said steam turbine and the steam produced by said heat exchanger with each other.

5. The heat energy supply system according to claim 1, wherein said steam supply line separately supplies the steam discharged from said steam turbine and the steam heated by said heat exchanger to corresponding different heat utilization facilities.

6. The heat energy supply system according to claim 1, wherein the system further comprises a circulation pump for circulating, to said boiler, the heat medium condensed after being utilized as steam in said heat utilization facility.

7. The heat energy supply system according to claim 1, wherein said heat pump heats the heat medium by introducing the waste heat or the heat obtained from environment to be directly inputted to said heat exchanger.

8. The heat energy supply system according to claim 2, wherein said boiler is operated using, as a heating source, exhaust gas from an engine for converting combustion energy to a driving force, and said heat pump includes a variable speed reducer for coupling said steam turbine and one of said compressors or said expansion turbine which is driven by motive power obtained from said steam turbine.

9. The heat energy supply system according to claim 3, wherein an outlet of said expansion turbine and an inlet of one of said compressors in the upsteam stage are connected to an upper space in said heat exchanger, and said heat exchanger includes a partition dividing the upper space into two parts on a side closer to said turbine and on a side closer to said one compressor.

10. The heat energy supply system according to claim 1, wherein the heat medium is water.

* * * * *